UNITED STATES PATENT OFFICE.

WILLIAM N. BLAKEMAN, JR., OF MOUNT VERNON, NEW YORK.

PROCESS OF UTILIZING METALLIC AND EARTHY OXIDES AND SALTS AS PIGMENTS OR PAINTS.

SPECIFICATION forming part of Letters Patent No. 496,990, dated May 9, 1893.

Application filed December 2, 1892. Serial No. 453,887. (No specimens.)

*To all whom it may concern:*

Be it known that I, WILLIAM N. BLAKEMAN, Jr., of Mount Vernon, in the county of Westchester and State of New York, have invented a new and useful Process of Utilizing Metallic and Earthy Oxides and Salts as Pigments or Paints, which invention is fully set forth in the following specification.

The object of this invention is to produce a pigment or paint in which the reactions between its constituents which effect the drying of the paint, shall be retarded or comparatively slow while the paint or its solid constituents are in bulk or not exposed to the air, but which reactions, when the paint is applied in the usual manner in thin coats, as with a brush, shall be very positive, effecting a rapid absorption and fixation of carbon dioxide *in situ* and a consequent rapid drying on exposure to the atmosphere.

The invention will first be described in detail and then particularly set forth in the claims.

Most of the oxides and salts above named, when exposed to the atmosphere, have a natural tendency to pass to carbonates, the state of greatest opacity and insolubility. But this action is slow and feeble, and even then it may be neutralized or cease altogether, in the process of induration. My process of treating said oxides and salts, including the sub-carbonates, not only prevents any interruption of the natural carbonating action of the atmosphere but also excites, or stimulates, or adds to, such action, due to the addition to the oxides or salts of chemical agents having a strong affinity for carbon dioxide, some of which agents exercise this affinity in more than one state such as in salt, solution, or a derivative from such salt. Thus, in my process when the material treated is exposed to the air and applied as a paint, the process of conversion into the state of carbonate will be accelerated and strengthened and the reaction will be carried on by absorption and fixation of carbon dioxide throughout the mass of material until the mass is completely carbonated. Some of the salts which may be employed to produce carbonating action are such as borate of magnesia, monometa-borate of soda, sulphate of magnesia, sulphate of alumina and alum.

In carrying out my process I may make the product or manufacture in the commercial form of a "free dry pigment," or that of "a pigment ground in oil," or that of a "ready-mixed paint."

In preparing the material, oxide or salt, as a "free dry pigment," I thoroughly incorporate therewith an agent or agents having a strong affinity for carbon dioxide such as, preferably, borate of magnesia or monometaborate of soda; and if basic acetate of lead be chosen as a pigment, the addition of ten to fifteen per cent. of borate of magnesia will give good results, care being taken to exclude the air from the mixture, as the affinity of this mixture for carbon-dioxide is great. If litharge or protoxide of lead is chosen for a pigment one or two per cent. of normal or neutral acetate of lead should be intimately ground with it, in addition to the borate of magnesia or other agent having an affinity for carbon-dioxide. These mixtures may be made, if desired, with the ingredients in a condition slightly moist instead of perfectly dry.

In the case of the two materials above mentioned selected for pigments, the one is already basic to carbon dioxide before the addition to it of the carbon-dioxide-absorbent, and the other (litharge) is changed into basic acetate of lead by the addition of the normal or neutral acetate of lead before the addition of the carbon-dioxide-absorbent. But in the case of selecting other oxides or salts as materials for dry pigments, these may be first made basic to carbon dioxide by incorporating with them a metallic soap such as is hereinafter described for making ready mixed paints, in which case the addition of the soap may be omitted in making the mixed paints, or less soap used therefor. The addition of the soap to the materials for dry pigments may be made thereto without essentially changing the dry character of the same. If the salts of the alkaline earths be selected as pigments better results will be obtained if used in the state of hydrates.

In preparing the material "ground in oil," a drying oil, but preferably a drying-oil such as below described, may be added to the pigment to bring the whole to a stiff and heavy paste.

In preparing "ready-mixed paints" I first take as a vehicle for mixture with the selected pigment, preferably a drying-oil, and impart to it an alkaline or basic reaction by dissolving in it by the aid of heat if desired a metallic soap, preferably a metallic soap having an affinity for carbon-dioxide, such as alumina-soap. The application of heat will hasten the amalgamation of the soap with the oil and other ingredients used. To the oil thus treated I then add a salt or salts capable of absorbing carbon dioxide, such as monometa-borate of soda, borate of magnesia, or sulphate of magnesia, and after thoroughly commingling one or all of them with the oil, I then thoroughly mix into the oil any of the oxides and salts above named which it may be desired to use as a pigment, and when this mixture is spread or exposed to the atmosphere as in the art of painting, the carbonating reaction set up is rapidly carried on by absorption and transmission through the mass till the whole is carbonated. If, therefore, in the making of the paint, the material used as the pigment be highly sensitive to the absorption of carbon dioxide, it may be combined with a neutral liquid vehicle; or if the liquid vehicle be basic, and highly sensitive to the absorption of carbon dioxide, it may be combined with a neutral pigment; or both the pigment and liquid vehicle may be combined if each be basic, and highly sensitive, to carbon dioxide. If either one be highly and the other feebly basic, and sensitive, to carbon dioxide, the liquid vehicle and the pigment may be combined into a paint, if, in any case, the reaction, alkaline or basic to carbon dioxide, be strong enough to absorb and fix carbon dioxide until the whole covering mass, or coat of paint, is carbonated *in situ*, by which absorption of carbon dioxide the rapid drying of the paint is effected.

I do not confine myself to the progressive steps here named as they may be varied with good results, but as the object is the absorption and fixation of carbon dioxide as rapidly as possible, I have found the best results are given when the vehicle is made thoroughly alkaline or basic at first. If the pigment has been prepared previously, as a "free dry pigment" as above described, the presence in the oil of more of the same carbonating agent, or another agent having an affinity for carbon dioxide, will not interfere with the desired result, after mixture with the oil.

In all three forms as dry pigments, or ground in oil, or mixed paints, the product for commercial use should be put up in kegs, cans or cases, comparatively air-tight in construction, in order to retard the setting up of carbonating reactions between the ingredients until they are applied as a paint, when such actions will be rapid *in situ*.

If litharge is used as a pigment one or two per cent. of normal or neutral acetate of lead should be ground with it and when this mixture is made into a paint and the paint is applied and exposed to the atmosphere there will be set in operation a progressive formation of basic acetate of lead, and its successive decomposition by carbon dioxide until the entire mass is carbonated throughout. In this case the reactions of the pigment with neutral acetate and carbon dioxide would be expressed by the following notations:

I. $2(PbO) + Pb2(C_2H_3O_2) = (PbO - Pb - PbO)\ 2(C_2H_3O_2).$

II. $(PbO - Pb - PbO)2(C_2H_3O_2) + 2CO_2 = 2(PbCO_3) + Pb(2C_2H_3O_2).$

In carrying out my process, I do not confine myself to fixed proportions of the materials above named, owing to the variety of the substances available for pigments to which it may be applied as well as to the diversity in density of the liquid vehicles which may be employed and diverse activity of the carbonating agents. But if basic acetate of lead be selected as the pigment to be subjected to my process and oil as the liquid vehicle for the same, the several proportions of elements which will give satisfactory results are as follows: from five to eight per cent. of metallic soap to the oil used; from one hundred to one hundred and fifty per cent. of the lead acetate to the oil; and from ten to fifteen per cent. of borate of magnesia to the lead acetate. As basic acetate of lead when mixed with the oil will give an alkaline or basic reaction to the oil, the metallic soap may be dispensed with and the acetate of lead when thus used as the pigment will then act in the double capacity of effecting an alkaline or basic reaction in the oil and also as the pigment. But the use of the metallic soap in addition is advantageous in making the carbonating reactions or process cumulative.

By this invention a pure white paint can not only be made and laid on in its original whiteness, but it will also dry perfectly white. Where special color is desired, not inherent in the pigment used, of course any neutral, or other, coloring agent or process, may be used which will not destroy the carbonating drying action in the paint when laid on any surface by brush or in any other usual manner.

Having thus fully described my invention, I claim—

1. The hereinbefore described process of making carbonates for pigments, which consists in combining with metallic and earthy oxides, acetates, hydrates and subcarbonates basic to carbon dioxide, salts capable of absorbing carbon dioxide when the pigments are applied as paints, substantially as set forth.

2. The hereinbefore described process of converting metallic and earthy oxides, acetates, hydrates and subcarbonates into carbonates for pigments, which consists in combining with the same an agent basic to carbon dioxide and adding salts capable of absorbing carbon dioxide when the pigments are applied as paints, substantially as set forth.

3. The hereinbefore described process of converting metallic and earthy oxides, acetates, hydrates and subcarbonates into carbonates for pigments, which consists in mixing with the same, a liquid vehicle capable of absorbing carbon dioxide, and salts also capable of absorbing carbon dioxide substantially as and for the purposes set forth.

4. The process of converting the oxides, acetates, hydrates and sub-carbonates of metallic and earthy pigments into carbonates of the same, consisting in mixing with any one of said substances a liquid vehicle, basic to carbon dioxide, and salts capable of absorbing and fixing carbon dioxide, substantially as set forth.

5. The process of converting the oxides, acetates hydrates and sub-carbonates of metallic and earthy pigments into carbonates of the same, consisting in mixing with any one of said substances an alkaline liquid vehicle, and salts capable of absorbing and fixing carbon dioxide, substantially as set forth.

6. As a new article of manufacture for a pigment or paint, a compound or mixture of an oxide and a salt, one or both, and a salt capable of absorbing carbon dioxide, the whole ground or powdered into intimate mixture, with or without the addition of moisture, in the manner and proportions substantially as set forth.

7. As a new article of manufacture for a pigment or paint, a compound or mixture of basic acetate of lead and borate of magnesia, with or without the addition of moisture, substantially as set forth.

WM. N. BLAKEMAN, JR.

Witnesses:
FRANCIS P. REILLY,
JAMES F. COURT.